US011764855B2

(12) United States Patent
Yerramalli et al.

(10) Patent No.: US 11,764,855 B2
(45) Date of Patent: Sep. 19, 2023

(54) MANAGING BEAM SELECTION

(71) Applicant: QUALCOMM Incorporated, San Diego, CA (US)

(72) Inventors: Srinivas Yerramalli, Hyderabad (IN); Arumugam Chendamarai Kannan, San Diego, CA (US); Vinay Chande, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/136,204

(22) Filed: Dec. 29, 2020

(65) Prior Publication Data

US 2021/0250078 A1 Aug. 12, 2021

Related U.S. Application Data

(60) Provisional application No. 62/975,606, filed on Feb. 12, 2020.

(51) Int. Cl.
*H04B 7/08* (2006.01)
*H04W 74/08* (2009.01)
(Continued)

(52) U.S. Cl.
CPC ........... *H04B 7/088* (2013.01); *H04B 7/0888* (2013.01); *H04L 5/0053* (2013.01); *H04W 48/02* (2013.01);
(Continued)

(58) Field of Classification Search
CPC ..... H04B 7/0888; H04B 7/088; H04L 5/0053; H04W 48/02; H04W 72/042; H04W 72/14; H04W 74/0875
See application file for complete search history.

(56) References Cited

U.S. PATENT DOCUMENTS

2019/0357255 A1    11/2019 Sun et al.
2020/0314906 A1*   10/2020 Goyal .................. H04B 7/0695
2021/0298080 A1    9/2021  Wu

FOREIGN PATENT DOCUMENTS

WO    2019079500 A1    4/2019
WO    WO-2021016973 A1 *  2/2021  ....... H04L 27/26025

OTHER PUBLICATIONS

Choudhury R.R., et al., "Deafness: A MAC Problem in Ad Hoc Networks when Using Directional Antennas", Network Protocols, 2004, ICNP 2004, Proceedings of the 12th IEEE International Conference on Berlin, Germany Oct. 5-8, 2004, Piscataway, NJ, USA,IEEE, Oct. 5, 2004 (Oct. 5, 2004), XP010734830, pp. 283-292, DOI: 10.1109/ICNP.2004.1348118 ISBN: 978-0-7695-2161-9 Section I, p. 1-p. 2, figure 1. (10 pages).

(Continued)

*Primary Examiner* — Elton Williams
(74) *Attorney, Agent, or Firm* — Arun Swain

(57) ABSTRACT

This disclosure provides systems, methods and apparatus, including computer programs encoded on computer storage media, for managing beam selection. In one aspect, an initiating wireless device may determine whether a pre-grant acknowledgement associated with a first beam has been received from a responding wireless device within an expected receive time. The initiating wireless device may generate an indication to prevent the initiating wireless device from using the first beam for a blocking duration in response to determining that the pre-grant acknowledgement associated with the first beam has not been received within the expected receive time.

22 Claims, 10 Drawing Sheets

(51) Int. Cl.
  *H04W 48/02* (2009.01)
  *H04L 5/00* (2006.01)
  *H04W 72/23* (2023.01)

(52) U.S. Cl.
  CPC ....... *H04W 72/23* (2023.01); *H04W 74/0875* (2013.01)

(56) References Cited

OTHER PUBLICATIONS

International Search Report and Written Opinion—PCT/US2020/067565—ISA/EPO—dated Mar. 11, 2021. 15 pages.
Samsung: "LBT Types in NR-U", 3GPP Draft, 3GPP TSG-RAN WG2 Meeting #106, R2-1907637, 3rd Generation Partnership Project (3GPP), May 13, 2019, XP051731071, 2 Pages, Retrieved from the Internet: URL:http://www.3gpp.org/ftp/Meetings%5F3GPP%5FSYNC/RAN2/Docs/R2%2DI907637%2Ezip [retrieved on May 13, 2019] Section 2.1, p. 1.

* cited by examiner

MANAGING BEAM SELECTION

RELATED APPLICATIONS

This application claims the benefit of priority to U.S. Provisional Patent Application No. 62/975,606 entitled "MANAGING BEAM SELECTION" filed Feb. 12, 2020, the entire contents of which are incorporated herein by references for all purposes.

TECHNICAL FIELD

This disclosure relates generally to wireless devices, and more particularly to enabling wireless devices to manage the selection and use of beams in wireless communications.

DESCRIPTION OF RELATED TECHNOLOGY

In wireless communication systems, such as those specified under standards for Fifth Generation (5G) New Radio (NR), wireless devices such as base stations, mobile devices, and other devices may use beamforming to compensate for high path loss and short range in millimeter wavelength frequency bands. An initiating wireless device, such as a base station, may grant a responding wireless device, such as a mobile device, access to a communication resource, such as a downlink channel on a beam. If the responding wireless device is unable to send an acknowledgement message to the initiating wireless device due to local conditions, such as jamming, the initiating wireless device may be unable to detect the local conditions affecting the responding wireless device.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless device that initiates communication (hereinafter referred to as an "initiating wireless device") with another wireless device (hereinafter referred to as a "responding wireless device"). Some implementations may include methods performed by an apparatus including a processing device of the initiating wireless device for managing beam selection for communications with the responding wireless device.

Some implementations may include determining, by the initiating wireless device, whether a pre-grant acknowledgement associated with a first beam has been received from a responding wireless device within an expected receive time. In such implementations, the pre-grant acknowledgement may be responsive to a pre-grant associated with the first beam that was sent by the initiating wireless device to the responding wireless device. In such aspects, the initiating wireless device may generate an indication (for example, in a memory of the initiating wireless device) to prevent the initiating wireless device from using the first beam for a blocking duration in response to determining that the pre-grant acknowledgement associated with the first beam has not been received within the expected receive time.

Some implementations may include transmitting to the responding wireless device a second pre-grant associated with the first beam after the blocking duration, determining whether a second pre-grant acknowledgement responsive to the second pre-grant has been received from the responding wireless device within an expected receive time, increasing the blocking duration in response to determining that the second pre-grant acknowledgement has not been received, and maintaining the indication to prevent the initiating wireless device from using the first beam for the increased blocking duration.

Some implementations may include generating an indication to enable the initiating wireless device to use the first beam in response to determining that the second pre-grant has been received from the responding wireless device within the expected time. Some implementations may include generating the indication to prevent the initiating wireless device from using the first beam for a blocking duration for each channel access priority class (CAPC). In some implementations, the blocking duration for one CAPC may differ from the blocking duration of at least one other CAPC.

Some implementations may include generating an indication to prevent the initiating wireless device from using a second beam that is similar to the first beam for the blocking duration in response to determining that the pre-grant acknowledgement associated with the first beam has not been received within the expected receive time.

Some implementations may include determining a parent beam from which the first beam and the second beam have each derived a quasi-colocation relationship, and generating the indication to prevent the initiating wireless device from using the second beam in response to determining that the first beam and the second beam have derived a respective quasi-colocation relationship from a same parent beam. Some implementations may include generating an indication to enable the initiating wireless device to use a second beam that is not similar to the first beam during the blocking duration.

Another innovative aspect of the subject matter described in this disclosure can be implemented in an apparatus of a wireless device. Some implementations may include a wireless transceiver and a processing system coupled to the wireless transceiver and configured to determine whether a pre-grant acknowledgement associated with a first beam has been received from a responding wireless device within an expected receive time, wherein the pre-grant acknowledgement is responsive to a pre-grant associated with the first beam, and generate an indication to prevent the initiating wireless device from using the first beam for a blocking duration in response to determining that the pre-grant acknowledgement associated with the first beam has not been received within the expected receive time.

In some implementations, the processing system may be configured to transmit to the responding wireless device a second pre-grant associated with the first beam after the blocking duration, determine whether a second pre-grant acknowledgement responsive to the second pre-grant has been received from the responding wireless device within an expected receive time, increase the blocking duration in response to determining that the second pre-grant acknowledgement has not been received, and maintain the indication to prevent the initiating wireless device from using the first beam for the increased blocking duration. In some implementations, the processing system may be configured to generate an indication to enable the initiating wireless device to use the first beam in response to determining that the second pre-grant has been received from the responding wireless device within the expected receive time.

In some implementations, the processing system may be configured to prevent the initiating wireless device from using the first beam for the blocking duration may include generating the indication to prevent the initiating wireless device from using the first beam for a blocking duration for each channel access priority class (CAPC). In some implementations, the processing system may be configured such that the blocking duration for one CAPC differs from the blocking duration of at least one other CAPC.

In some implementations, the processing system may be configured to generate an indication to prevent the initiating wireless device from using a second beam that is similar to the first beam for the blocking duration in response to determining that the pre-grant acknowledgement associated with the first beam has not been received within the expected receive time. In some implementations, the processing system may be configured to generate the indication to prevent the initiating wireless device from using the second beam that is similar to the first beam for the blocking duration by determining a parent beam from which the first beam and the second beam have each derived a quasi-colocation relationship, and generating the indication to prevent the initiating wireless device from using the second beam in response to determining that the first beam and the second beam have derived a respective quasi-colocation (QCL) relationship from a same parent beam. In some implementations, the processing system may be configured to generate an indication to enable the initiating wireless device to use a second beam that is not similar to the first beam during the blocking duration.

Another innovative aspect of the subject matter described in this disclosure can be implemented in a non-transitory processor-readable medium having stored thereon processor-executable instructions configured to cause a processing system of a wireless device to perform operations of various implementations. In some implementations, the stored processor-executable instructions may be configured to cause a processing system of a wireless device to perform operations including determining whether a pre-grant acknowledgement associated with a first beam has been received from a responding wireless device within an expected receive time, wherein the pre-grant acknowledgement is responsive to a pre-grant associated with the first beam, and generating an indication to prevent the initiating wireless device from using the first beam for a blocking duration in response to determining that the pre-grant acknowledgement associated with the first beam has not been received within the expected receive time.

In some implementations, the stored processor-executable instructions may be configured to cause a processing system of a wireless device to perform operations further including transmitting to the responding wireless device a second pre-grant associated with the first beam after the blocking duration, determining whether a second pre-grant acknowledgement responsive to the second pre-grant has been received from the responding wireless device within an expected receive time, increasing the blocking duration in response to determining that the second pre-grant acknowledgement has not been received, and maintaining the indication to prevent the initiating wireless device from using the first beam for the increased blocking duration. In some implementations, the stored processor-executable instructions may be configured to cause a processing system of a wireless device to perform operations further including generating an indication to enable the initiating wireless device to use the first beam in response to determining that the second pre-grant has been received from the responding wireless device within the expected receive time.

In some implementations, the stored processor-executable instructions may be configured to cause a processing system of a wireless device to perform operations such that generating the indication to prevent the initiating wireless device from using the first beam for the blocking duration includes generating the indication to prevent the initiating wireless device from using the first beam for a blocking duration for each channel access priority class (CAPC). In some implementations, the stored processor-executable instructions may be configured to cause a processing system of a wireless device to perform operations such that the blocking duration for one CAPC differs from the blocking duration of at least one other CAPC.

In some implementations, the stored processor-executable instructions may be configured to cause a processing system of a wireless device to perform operations further including generating an indication to prevent the initiating wireless device from using a second beam that is similar to the first beam for the blocking duration in response to determining that the pre-grant acknowledgement associated with the first beam has not been received within the expected receive time. In some implementations, the stored processor-executable instructions may be configured to cause a processing system of a wireless device to perform operations such that generating the indication to prevent the initiating wireless device from using the second beam that is similar to the first beam for the blocking duration may include determining a parent beam from which the first beam and the second beam have each derived a quasi-colocation relationship, and generating the indication to prevent the initiating wireless device from using the second beam in response to determining that the first beam and the second beam have derived a respective quasi-colocation relationship from a same parent beam. In some implementations, the stored processor-executable instructions may be configured to cause a processing system of a wireless device to perform operations including generating an indication to enable the initiating wireless device to use a second beam that is not similar to the first beam during the blocking duration.

Another innovative aspect of the subject matter described in this disclosure can be implemented in a wireless device having means for performing functions of various implementation methods. Some implementations may include a wireless having means for determining whether a pre-grant acknowledgement associated with a first beam has been received from a responding wireless device within an expected receive time, wherein the pre-grant acknowledgement is responsive to a pre-grant associated with the first beam, and means for generating an indication to prevent the initiating wireless device from using the first beam for a blocking duration in response to determining that the pre-grant acknowledgement associated with the first beam has not been received within the expected receive time.

Some implementations may further include means for transmitting to the responding wireless device a second pre-grant associated with the first beam after the blocking duration, means for determining whether a second pre-grant acknowledgement responsive to the second pre-grant has been received from the responding wireless device within an expected receive time, means for increasing the blocking duration in response to determining that the second pre-grant acknowledgement has not been received, and means for maintaining the indication to prevent the initiating wireless device from using the first beam for the increased blocking duration. Some implementations may further include means for generating an indication to enable the initiating wireless device to use the first beam in response to determining that the second pre-grant has been received from the responding wireless device within the expected receive time.

In some implementations, means for generating the indication to prevent the initiating wireless device from using the first beam for the blocking duration may include means for generating the indication to prevent the initiating wireless device from using the first beam for a blocking duration for each channel access priority class (CAPC). In some embodiments, the blocking duration for one CAPC may from the blocking duration of at least one other CAPC.

Some implementations may further include means for generating an indication to prevent the initiating wireless device from using a second beam that is similar to the first beam for the blocking duration in response to determining that the pre-grant acknowledgement associated with the first beam has not been received within the expected receive time. Some implementations may further include means for means for generating the indication to prevent the initiating wireless device from using the second beam that is similar to the first beam for the blocking duration may include means for determining a parent beam from which the first beam and the second beam have each derived a quasi-colocation relationship, and means for generating the indication to prevent the initiating wireless device from using the second beam in response to determining that the first beam and the second beam have derived a respective quasi-colocation relationship from a same parent beam. Some implementations may further include means for generating an indication to enable the initiating wireless device to use a second beam that is not similar to the first beam during the blocking duration.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
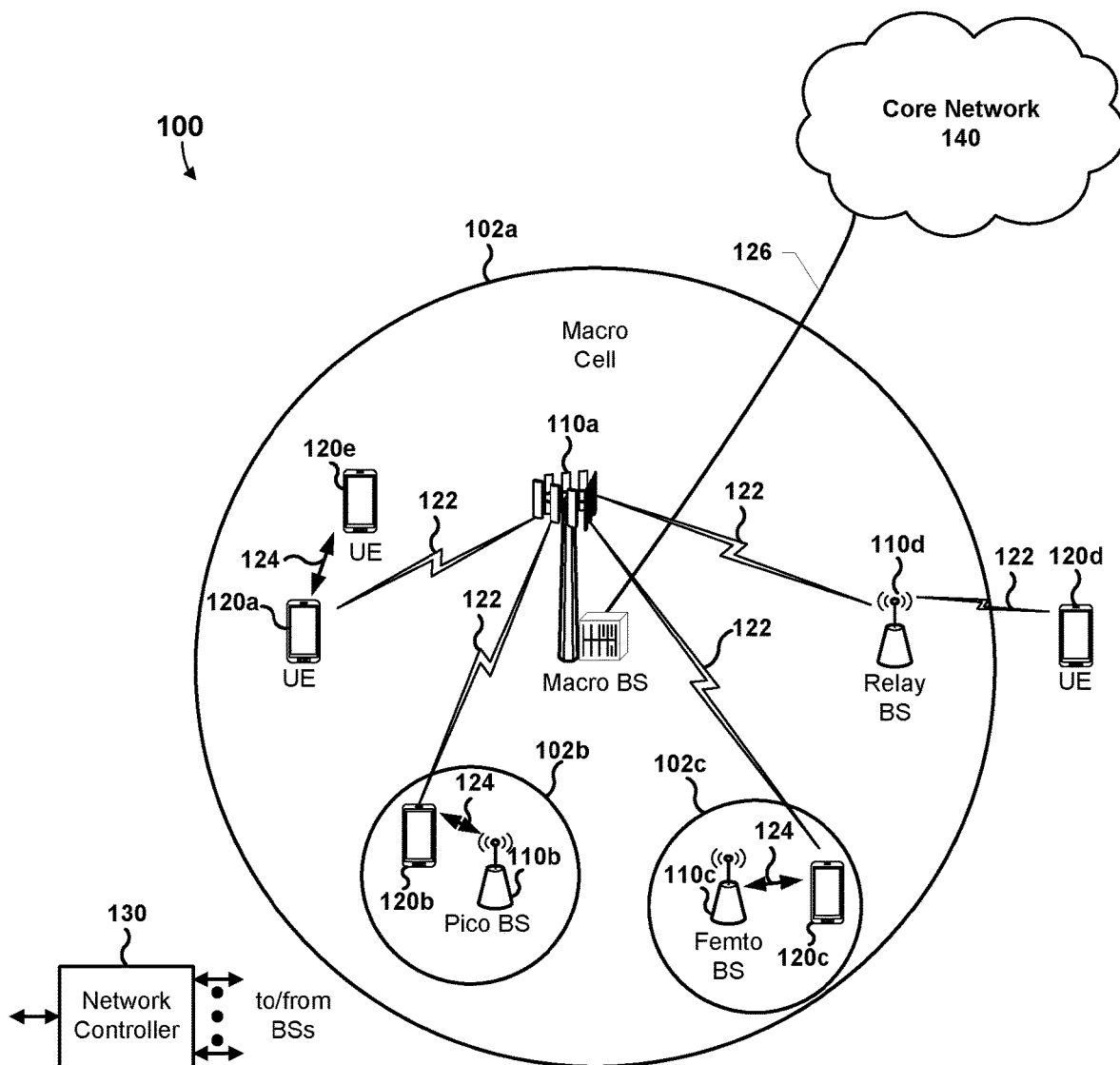
FIG. 1 shows a system block diagram of an example communications system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

Various implementations enable an initiating wireless device to manage beam selection for communications with a responding wireless device. In various implementations, an apparatus, such as a processing system, of the initiating wireless device may use a contention window-like mechanism to avoid using a beam for communications with the responding wireless device in cases when the initiating wireless device has determined that the responding wireless device is unable to use the beam for communications (for example, because the beam may be jammed locally to the responding wireless device).

In some implementations, the initiating wireless device may determine whether a pre-grant acknowledgement associated with a first beam has been received from a responding wireless device within an expected receive time. The pre-grant acknowledgement is expected to be received within a certain time or duration following, and in response to, a pre-grant of a first beam sent by the initiating wireless device to the responding wireless device. In some implementations, in response to determining that the pre-grant acknowledgement associated with the first beam has not been received within the expected receive time (i.e., by the end of the expected receive time or expiration of the expected receive duration), the initiating wireless device may transmit using the first beam for a blocking duration. To do so, the initiating wireless device may generate an indication to prevent the initiating wireless device from using the first beam for a blocking duration. For example, the initiating wireless device may generate such an indication and may store the indication in a memory of the initiating wireless device.

In some implementations, the initiating wireless device may attempt to determine whether the first beam has become usable by the responding wireless device for communications. In some implementations, the initiating wireless device may transmit to the responding wireless device a second pre-grant associated with the first beam after the blocking duration. The initiating wireless device may determine whether a second pre-grant acknowledgement responsive to the second pre-grant has been received from the responding wireless device within an expected receive time. In some implementations, the initiating wireless device may increase the blocking duration in response to determining that the second pre-grant acknowledgement has not been received. In some implementations, the initiating wireless device may double the blocking duration. In some implementations, the initiating wireless device may increase the blocking duration by another suitable duration. In some implementations, the initiating wireless device may maintain the indication (for example, in memory) to prevent the initiating wireless device from using the first beam for the increased blocking duration.

Particular implementations of the subject matter described in this disclosure can be implemented to realize one or more of the following potential advantages. Some implementations may improve the operations of an initiating wireless device and a communication network by providing the initiating wireless device with a mechanism for managing beam selection in situations in which the responding wireless device does not, or cannot, provide an acknowledgment to a pre-grant from the initiating wireless device. Some implementations may improve the operations of an initiating wireless device and the communication network by improving the efficiency of beam selection and utilization. Some implementations may improve the operations of an initiating wireless device and the communication network by enabling the initiating wireless device to reduce latency in re-selecting from a beam that is unusable for communications with the responding wireless device to a second beam that is usable for communications with the responding wireless device.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (such as smart rings, smart bracelets, etc.), entertainment devices (such as wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable apparatus (such as a processing system).

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (such as a CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The term "processing system" is used herein to refer to a processor, an SOC, or an SIP coupled to or including a memory device.

FIG. 1 shows a system block diagram illustrating an example communications system 100. The communications system 100 may be an 5G NR network, or any other suitable network such as an LTE network.

The communications system 100 may include a heterogeneous network architecture that includes a core network 140 and a variety of mobile devices (illustrated as wireless device 120a-120e in FIG. 1). The communications system 100 also may include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a mobile device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, various implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
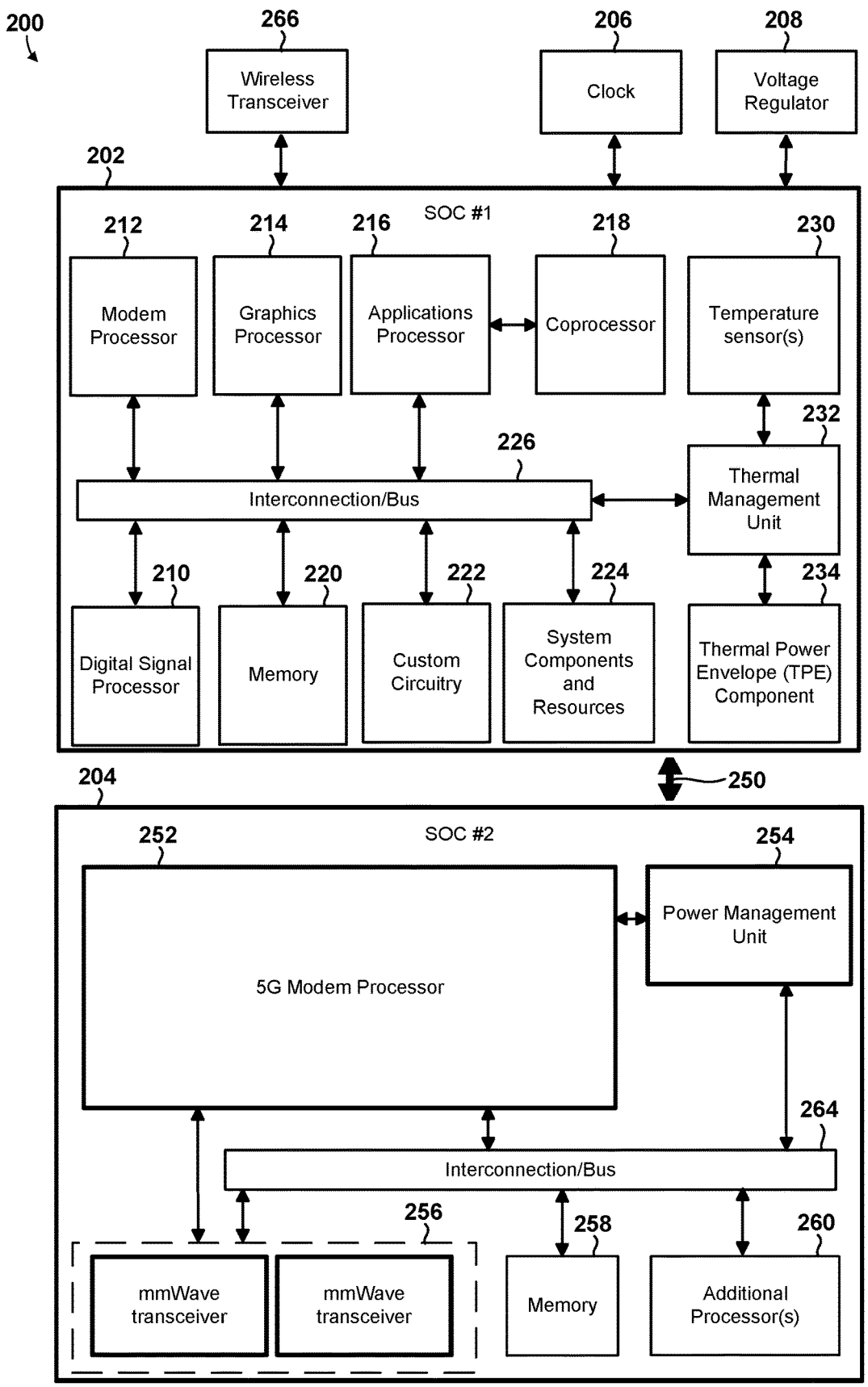
FIG. 2 shows a component block diagram of an apparatus of a wireless device including a processing system.

FIG. 2 shows a component block diagram of an apparatus 200 of a wireless device including a processing system 202, 204. Various implementations may be implemented on a number of single processor and multiprocessor, and multi-core processing systems, including a system-on-chip (SOC) or system in a package (SIP).

With reference to FIGS. 1 and 2, the illustrated apparatus 200 (which may include a SIP in some implementations) includes two processing system SOCs 202, 204 coupled to a clock 206, a voltage regulator 208, and a wireless transceiver 266 configured to send and receive wireless communications via an antenna (not shown) to or from wireless devices, such as a base station 110a. In various implementations, one or the other of the processing system SOCs 202, 204 may be configured to execute operations of the wireless transceiver 266 to manage beam selection as described in more detail herein. In some implementations, the first SOC 202 may operate as a central processing unit (CPU) of the wireless device that carries out the instructions of software application programs by performing the arithmetic, logical, control and input/output (I/O) operations specified by the instructions. In some implementations, the second SOC 204 may operate as a specialized processing system. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first processing system SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first processing system SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.). In some implementations, any or all of the processors 210, 212, 214, 216, 218, 252, 260 may be a component of a processing system. A processing system may generally refer to a system or series of machines or components that receives inputs and processes the inputs to produce a set of outputs (which may be passed to other systems or components of, for example, the first processing system SOC 202 or the second processing system SOC 250). For example, a processing system of the first processing system SOC 202 or the second processing system SOC 250 may refer to a system including the various other components or subcomponents of the first processing system SOC 202 or the second processing system SOC 250.

The processing system SOC 202 or the second processing system SOC 250 may interface with other components of the first processing system SOC 202 or the processing system second SOC 250, and may process information received from other components (such as inputs or signals), output information to other components, etc. F processing system or example, a chip or modem of the first processing system SOC 202 or the second SOC 250 may include a processing system, a first interface to output information, and a second interface to receive information. In some cases, the first interface may refer to an interface between the processing system of the chip or modem and a transmitter, such that the first processing system SOC 202 or the processing system second SOC 250 may transmit information output from the chip or modem. In some cases, the second interface may refer to an interface between the processing system of the chip or modem and a receiver, such that the first processing system SOC 202 or the second processing system SOC 250 may receive information or signal inputs, and the information may be passed to the processing system. A person having ordinary skill in the art will readily recognize that the first interface also may receive information or signal inputs, and the second interface also may transmit information.

The first and second processing system SOCs 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first processing system SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second processing system SOCs 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second processing system SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the apparatus 200 discussed above, various implementations may be implemented in a wide variety of processing systems, which may include a single processor, multiple processors, multicore processors, or any combination thereof.

Figure 3:
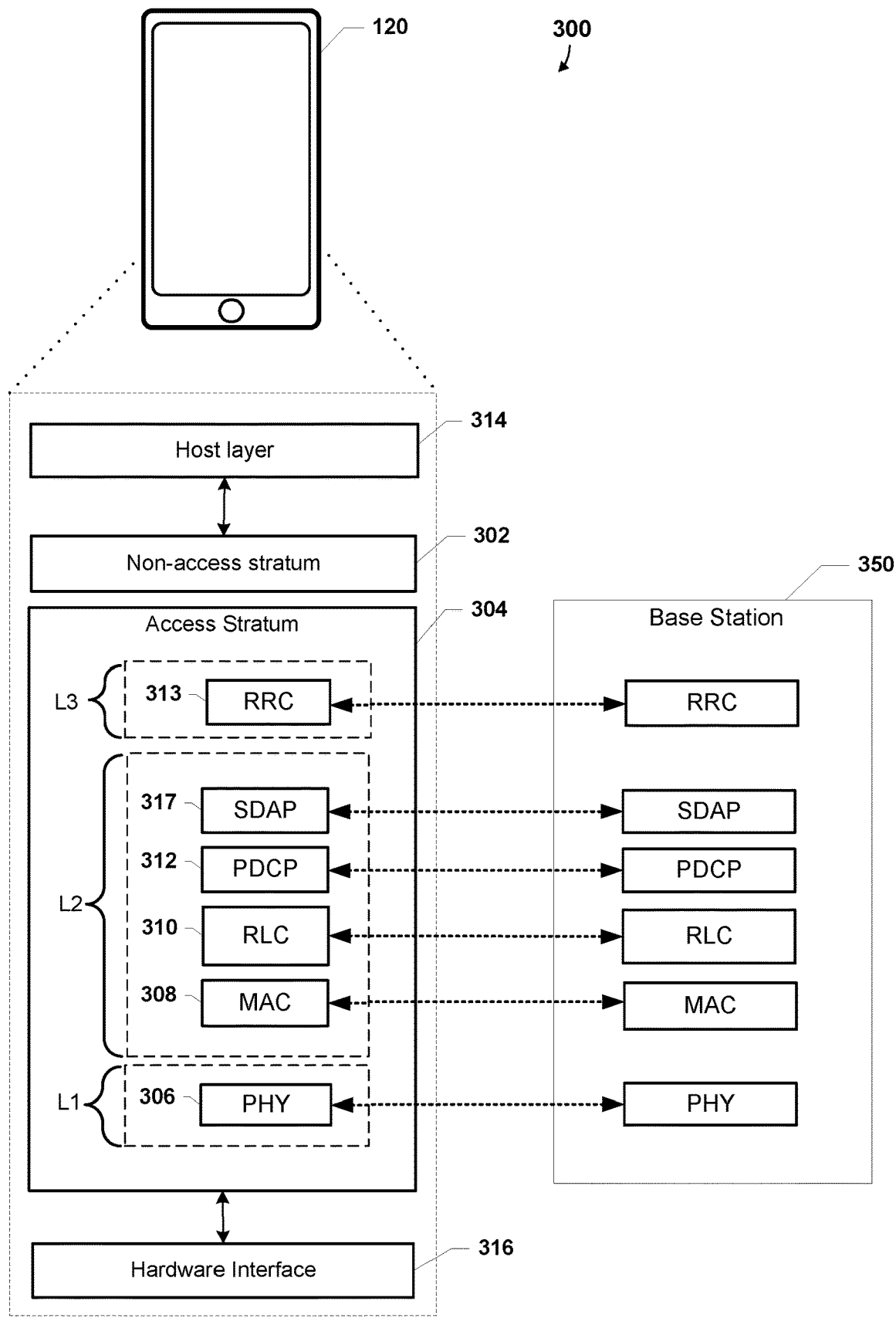
FIG. 3 shows a component block diagram of an example of a software architecture including a radio protocol stack for the user and control planes in wireless communications.

FIG. 3 shows a component block diagram of an example of a software architecture 300 including a radio protocol stack for the user and control planes in wireless communications. The software architecture 300 including a radio protocol stack for the user and control planes in wireless communications between a base station 350 (such as the base station 110a) and a wireless device 320 (such as the wireless device 120a-120e, 200). With reference to FIGS. 1-3, the wireless device 320 may implement the software architecture 300 to communicate with the base station 350 of a communication system (such as the communications system 100). In various implementations, layers in software architecture 300 may form logical connections with corresponding layers in software of the base station 350. The software architecture 300 may be distributed among one or more processing systems (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to specific 5G NR communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (such as the wireless transceiver 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions INCLUDING broadcasting system information, paging, and establishing and releasing an RRC signaling connection between the wireless device 320 and the base station 350.

In some implementations, the SDAP sublayer 317 may provide mapping between Quality of Service (QoS) flows and data radio bearers (DRBs). In the downlink, at the base station 350, the SDAP sublayer 317 may provide mapping for DL QoS flows to DRBs. In the uplink, at the wireless device 320, the SDAP sublayer 317 may deliver DL received QoS flows to upper layers. In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In some implementations, the software architecture 300 may include one or more higher logical layer (such as transport, session, presentation, application, etc.) that provide host layer functions. For example, in some implementations, the software architecture 300 may include a network layer (such as IP layer) in which a logical connection terminates at an access and mobility factor (AMF) or a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
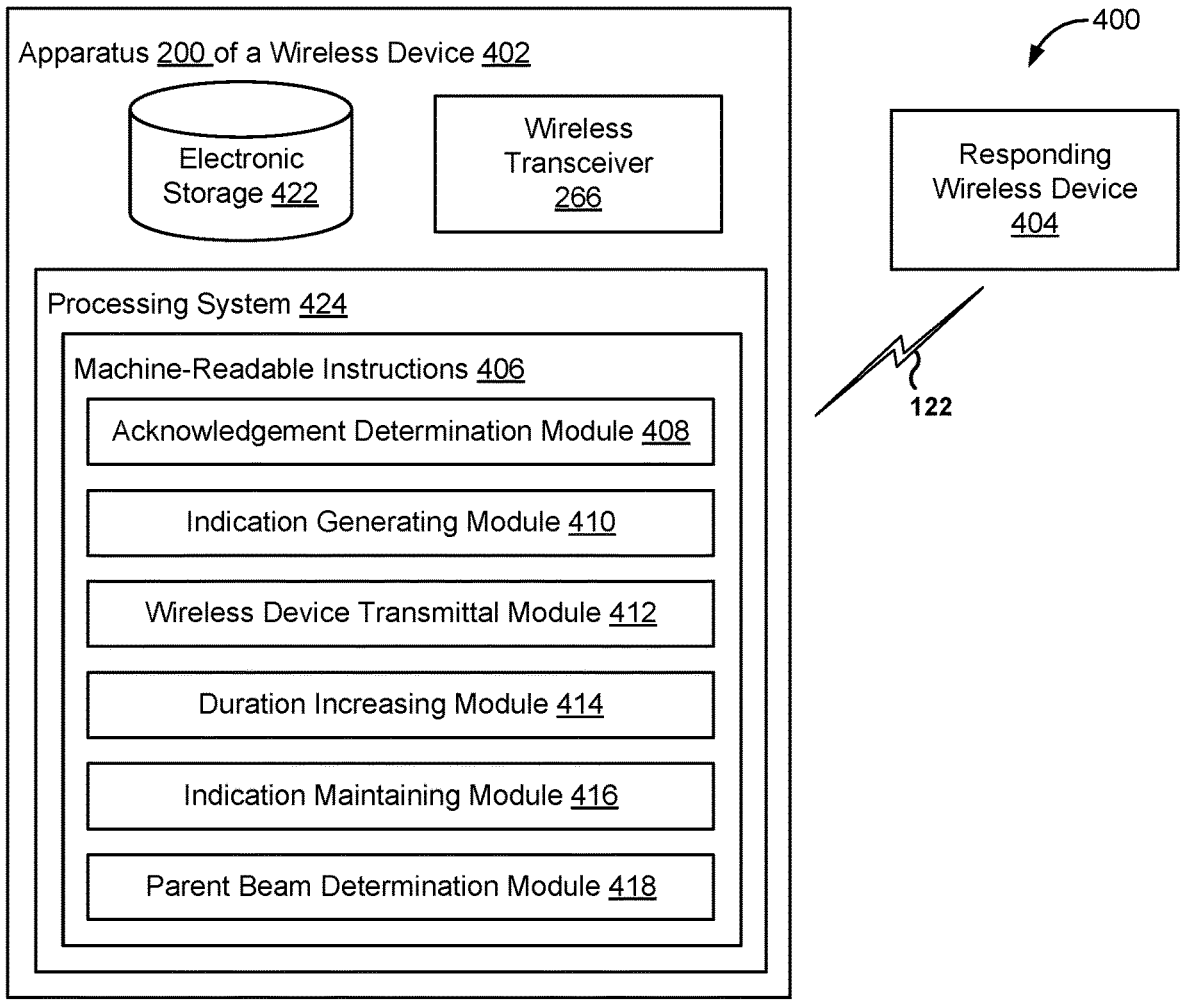
FIG. 4 shows a component block diagram of an example system configured to manage beam selection.

FIG. 4 shows a component block diagram illustrating an example system 400 that may be implemented in an apparatus 200 of a wireless device 402 and configured for managing beam selection. In some implementations, the system 400 may include an initiating wireless device 402 and a responding wireless device 404. With reference to FIGS. 1-4, the initiating wireless device 402 (such as the wireless device 120a-120e, 200, 320) may include an apparatus 200 including one or more processing systems 424 (e.g., processing system SOCs 202, 204) coupled to electronic storage 422 and one or more wireless transceivers 266. The responding wireless device 404 (such as the wireless device 120a-120e, 200, 320) may include similar components.

The one or more processing systems 424 of the apparatus 200 may be configured by machine-readable instructions 406, which may be stored on a non-transitory processor readable medium, such as the electronic storage 422 before loaded into the processor(s) 424 for execution. Machine-readable instructions 406 may include one or more instruction modules. The instruction modules may include computer program modules. The instruction modules may include one or more of an acknowledgement determination module 408, an indication generating module 410, a wireless device transmittal module 412, a duration increasing module 414, an indication maintaining module 416, a parent beam determination module 418, and other instruction modules.

The acknowledgment determination module 408 may be configured to determine whether a pre-grant acknowledgement associated with a first beam has been received from a responding wireless device within an expected receive time (i.e., by the end of the expected receive time or expiration of the expected receive duration). In some implementations, the pre-grant acknowledgement may be responsive to a pre-grant associated with the first beam. The acknowledgment determination module 408 may be configured to determine whether a second pre-grant acknowledgement responsive to the second pre-grant has been received from the responding wireless device within an expected receive time.

The indication generating module 410 may be configured to generate an indication to prevent the initiating wireless device from using the first beam for a blocking duration in response to determining that the pre-grant acknowledgement associated with the first beam has not been received within the expected receive time. The indication generating module 410 may be configured to generate an indication to enable the initiating wireless device to use the first beam in response to determining that the second pre-grant has succeeded. The indication generating module 410 may be configured to generate the indication to prevent the initiating wireless device from using the first beam for a blocking duration for each channel access priority class. In some implementations, the blocking duration for one CAPC may differ from the blocking duration of at least one other CAPC.

The indication generating module 410 may be configured to generate an indication to prevent the initiating wireless device from using a second beam that is similar to the first beam for the blocking duration in response to determining that the pre-grant acknowledgement associated with the first beam has not been received within the expected receive time. The indication generating module 410 may be configured to generate the indication to prevent the initiating wireless device from using the second beam in response to determining that the first beam and the second beam have derived a respective quasi-colocation relationship from a same parent beam. The indication generating module 410 may be configured to generate an indication to enable the initiating wireless device to use a second beam that is not similar to the first beam during the blocking duration.

The wireless device transmittal module 412 may be configured to transmit to the responding wireless device a second pre-grant associated with the first beam after the blocking duration.

The duration increasing module 414 may be configured to increase the blocking duration in response to determining that the second pre-grant acknowledgement has not been received.

The indication maintaining module 416 may be configured to maintain the indication to prevent the initiating wireless device from using the first beam for the increased blocking duration.

The parent beam determination module 418 may be configured to determine a parent beam from which the first beam and the second beam have each derived a quasi-colocation relationship.

In some implementations, the initiating wireless device 402 or the responding wireless device 404 may be operatively linked via one or more electronic communication links (such as the wireless communication link 122). In some implementations, the initiating wireless device 402 may communicate with the responding wireless device 404 via a wireless transceiver (such as the wireless transceiver 266).

The responding wireless device 404 may include one or more processors configured to execute computer program modules.

The apparatus 200 of the initiating wireless device 402 may include an electronic storage 422, one or more processing systems 424, or other components. The initiating wireless device 402 may include communication lines, or ports to enable the exchange of information with a network or other computing platforms. The illustration of the apparatus 200 of the initiating wireless device 402 is not intended to be limiting, and the initiating wireless device 402 may include a plurality of hardware, software, or firmware components operating together to provide the functionality attributed herein to the initiating wireless device 402.

The electronic storage 422 of the apparatus 200 may include non-transitory storage media that electronically stores information. The storage media of the electronic storage 422 may include one or both of system storage that is provided integrally (i.e., substantially non-removable) with the initiating wireless device 402 or removable storage that is removably connectable to initiating wireless device 402 via, for example, a port (such as a universal serial bus (USB) port, a firewire port, etc.) or a drive (such as a disk drive, etc.). The electronic storage 422 may include one or more of optically readable storage media (such as optical disks, etc.), magnetically readable storage media (such as magnetic tape, magnetic hard drive, floppy drive, etc.), electrical charge-based storage media (such as EEPROM, RAM, etc.), solid-state storage media (such as a flash drive, etc.), or other electronically readable storage media. The electronic storage 422 may store software algorithms, information determined by processor(s) 424, information received from the initiating wireless device 402, information received from the responding wireless device 404, or other information that enables the initiating wireless device 402 to function as described herein.

The processing system 424 may be configured to provide information processing capabilities in the initiating wireless device 402. As such, the processing system 424 may include one or more of a digital processor, an analog processor, a digital circuit designed to process information, an analog circuit designed to process information, a state machine, or other mechanisms for electronically processing information. Although the processing system 424 is shown as a single entity, this is for illustrative purposes only. In some implementations, processing system 424 may include a plurality of processing units. These processing units may be physically located within the same device. The processing system 424 may be configured to execute modules 408-418, or other modules. The processing system 424 may be configured to execute modules 408-418, or other modules by software; hardware; firmware; some combination of software, hardware, or firmware; or other mechanisms for configuring processing capabilities on the processing system 424. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-418 described below is for illustrative purposes, and is not intended to be limiting, as any of the modules 408-418 may provide more or less functionality than is described. For example, one or more of modules 408-418 may be eliminated, and some or all of its functionality may be provided by other ones of the modules 408-418. As another example, processing system 424 may be configured to execute one or more additional modules that may perform some or all of the functionality attributed below to one of the modules 408-418.

Figure 5:
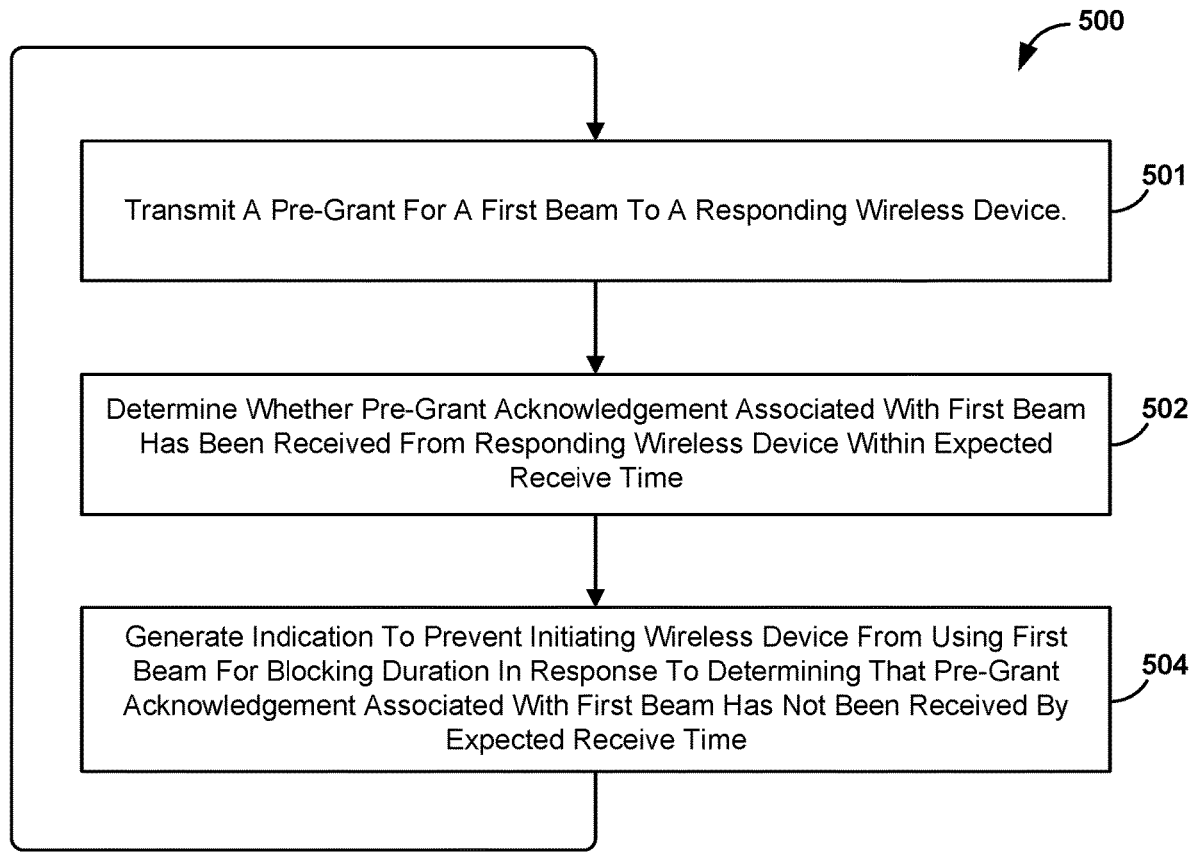
FIG. 5 shows a process flow diagram of an example method for managing beam selection by an apparatus of a wireless device.

FIG. 5 shows a process flow diagram of an example method 500 for managing beam selection. With reference to FIGS. 1-5, the operations of the method 500 may be performed by an apparatus (e.g., 200) including a processing system (such as 202, 204, 210, 212, 214, 216, 218, 252, 260, 424) of an initiating wireless device (such as the base station 110, 350, 402 or the wireless device 120a-120e, 200, 320, 404).

In block 501, the apparatus including a processing system of the wireless device may transmit a pre-grant for a first beam to a responding wireless device. In some implementations, the apparatus may utilize a Cat 2. Look Before Talk (LBT) procedure to determine that the first beam is unoccupied before initiating a Channel Occupancy Time (COT) on the first beam. Means for performing functions of the operations in block 501 may include an apparatus including the processing system (such as 210, 212, 214, 216, 218, 252, 260, 424) coupled to a wireless transceiver (such as the wireless transceiver 266).

In block 502, the apparatus including a processing system may determine whether a pre-grant acknowledgement associated with a first beam has been received from a responding wireless device within an expected receive time. In some implementations, the pre-grant acknowledgement may be expected to be received responsive to a pre-grant associated with the first beam. In some implementations, the apparatus including a processing system of the initiating wireless device may expect a response from the responding wireless device by or within a designated time or time period (for example, a particular communication slot or slots). Means for performing functions of the operations in block 502 may include an apparatus including the processing system (such as 210, 212, 214, 216, 218, 252, 260, 424) coupled to a wireless transceiver (such as the wireless transceiver 266).

In block 504, the apparatus including a processing system may generate an indication to prevent the initiating wireless device from using the first beam for a blocking duration in response to determining that the pre-grant acknowledgement associated with the first beam has not been received by the expected receive time. For example, the apparatus may determine that the pre-grant acknowledgment has not been received within the designated time or time period for receiving the pre-grant acknowledgment. In some implementations, the initiating wireless device may generate or select a randomly-sized duration for the blocking duration that may be, for example, at least a minimum duration. In some implementations, the initiating wireless device may not perform channel sensing or other procedures, such as an LBT procedure, during the blocking duration.

In some implementations, repeatedly sending pre-grants from the initiating wireless device may cause interference to a target receiver of an aggressor wireless device, such as a wireless device whose transmissions are causing interference on the first beam local to the responding wireless device. Some implementations may mitigate any such interference caused by the initiating wireless device by reducing a frequency at which the processor of the initiating wireless device sends further pre-grants. Means for performing functions of the operations in block 504 may include an apparatus including the processing system (such as 210, 212, 214, 216, 218, 252, 260, 424).

The method 500 may be repeated continuously or periodically as the processor may again perform the operations of block 502.

FIGS. 6A-6D show process flow diagrams of example operations 600a-600d that may be performed as part of the method for managing beam selection. With reference to FIGS. 1-6D, the operations 600a-600d may be performed by an apparatus (e.g., 200) including a processing system (such as 202, 204, 210, 212, 214, 216, 218, 252, 260, 424) of an initiating wireless device (such as the base station 110, 350, 402 or the wireless device 120a-120e, 200, 320, 404).

Figure 6A:
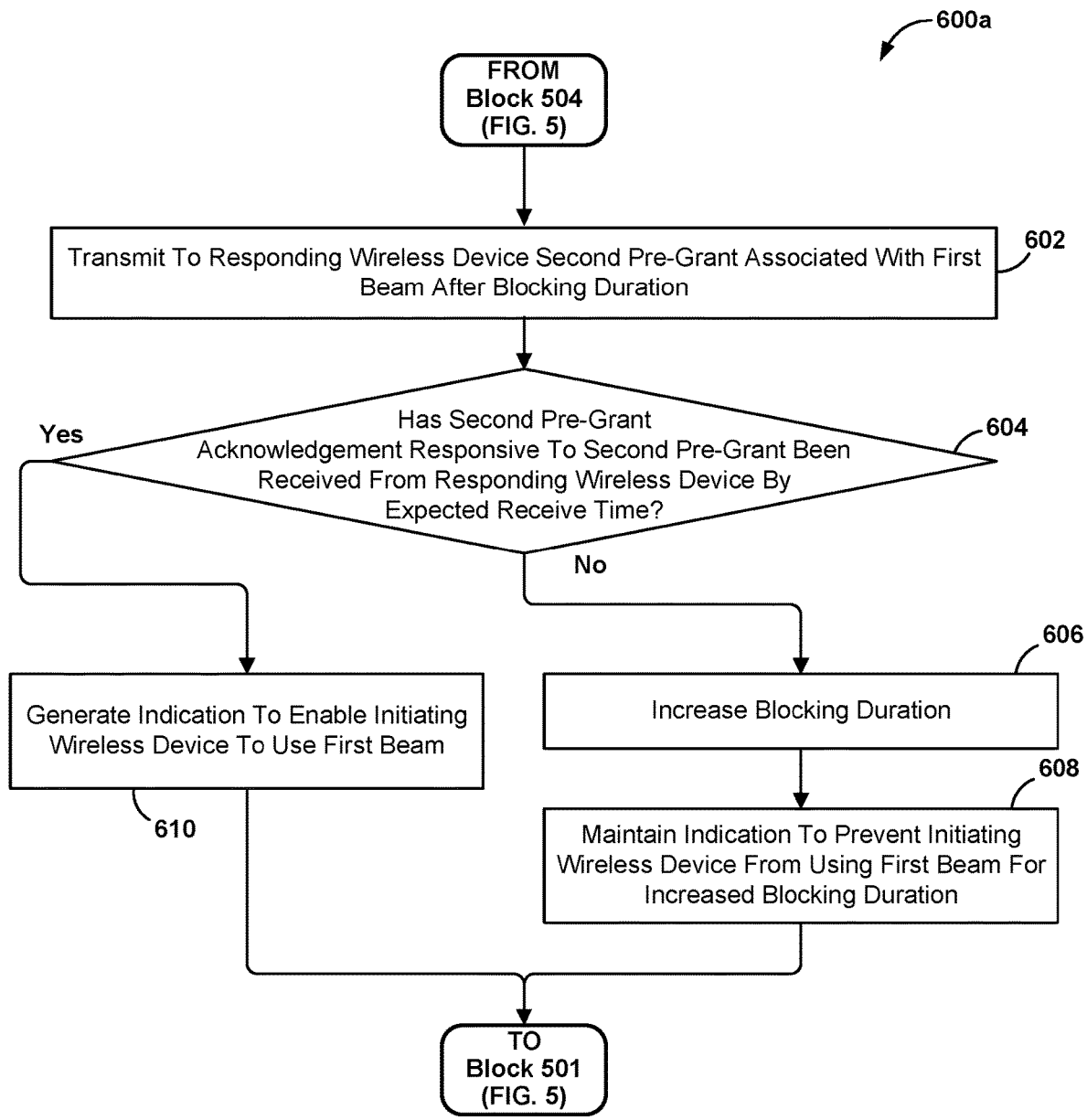
FIGS. 6A-6D show process flow diagrams of example operations that may be performed as part of the method for managing beam selection by an apparatus of a wireless device.

Referring to FIG. 6A, the apparatus including a processing system may transmit to the responding wireless device a second pre-grant associated with the first beam after the blocking duration in block 602. In some implementations, the apparatus may attempt to determine whether the first beam is usable by the responding wireless device for communications with the initiating wireless device. Means for performing functions of the operations in block 602 may include an apparatus including the processing system (such as 210, 212, 214, 216, 218, 252, 260, 424) coupled to a wireless transceiver (such as the wireless transceiver 266).

In determination block 604, the apparatus including a processing system may determine whether a second pre-grant acknowledgement responsive to the second pre-grant has been received from the responding wireless device by an expected receive time. Means for performing functions of the operations in block 502 may include an apparatus including the processing system (such as 210, 212, 214, 216, 218, 252, 260, 424) coupled to a wireless transceiver (such as the wireless transceiver 266).

In response to determining that the second pre-grant acknowledgement has not been received by the expected receive time (i.e., determination block 604="No"), the apparatus including a processing system may increase the blocking duration in block 606. In some implementations, the apparatus may expect a response to the second pre-grant (for example, a Cat 2 LBT-based pre-grant) by or within a designated time or time period (for example, a particular communication slot or slots). In some implementations, the apparatus may double the blocking duration. In some implementations, the apparatus may increase the duration by any suitable amount. Means for performing functions of the operations in block 502 may include an apparatus including the processing system (such as 210, 212, 214, 216, 218, 252, 260, 424).

In block 608, the apparatus including a processing system may maintain the indication to prevent the initiating wireless device from using the first beam for the increased blocking duration. Means for performing functions of the operations in block 502 may include an apparatus including the processing system (such as 210, 212, 214, 216, 218, 252, 260, 424).

In response to determining that the second pre-grant acknowledgement has been received by the expected receive time (i.e., determination block 604="Yes"), the apparatus including a processing system may generate an indication to enable the initiating wireless device to use the first beam in block 610. Means for performing functions of the operations in block 502 may include an apparatus including the processing system (such as 210, 212, 214, 216, 218, 252, 260, 424).

Following the operations of block 608 or block 610, the apparatus including a processing system may perform the operations of block 502 (FIG. 5) as described.

Figure 6B:
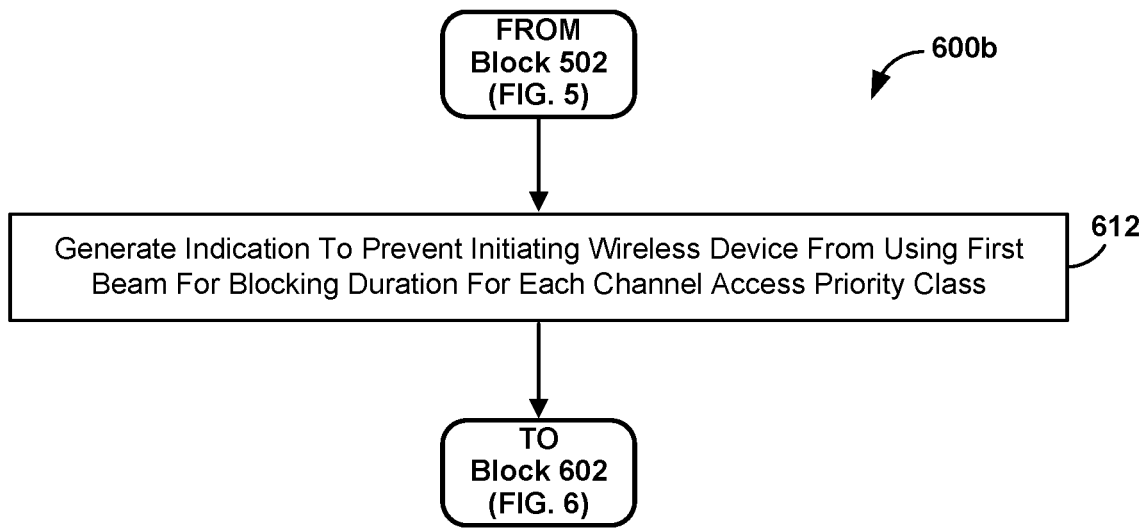

Referring to FIG. 6B, following the operations of block 502 (FIG. 5), the apparatus including a processing system may generate the indication to prevent the initiating wireless device from using the first beam for a blocking duration for each channel access priority class (CAPC) in block 612. In some implementations, to provide differentiated quality of service in certain access procedures, a communication system may provide a plurality of access priority classes, for example, to access a communication channel. In such implementations, the apparatus may determine a blocking duration for each of a plurality of CAPCs for the first beam, any duration of which may be the same or different from the blocking duration of another CAPC. In some implementations, the apparatus may determine a blocking duration that is different for each CAPC based on a priority contention time of each CAPC. Means for performing functions of the operations in block 602 may include an apparatus including the processing system (such as 210, 212, 214, 216, 218, 252, 260, 424).

The apparatus including a processing system may perform the operations of block 502 (FIG. 5) as described. In some implementations, the apparatus may determine whether a pre-grant acknowledgement associated with a first beam has been received from a responding wireless device by an expected receive time for one or more CAPCs.

Following the operations of block 612, the apparatus including a processing system may perform the operations of block 602 (FIG. 6) as described.

In some implementations, the apparatus including a processing system of the initiating wireless device may attempt to determine an alternate beam for use in communications with the responding wireless device. Additionally or alternatively, the apparatus of the initiating wireless device may determine one or more other beams to avoid for communications with the responding wireless device.

Figure 6C:
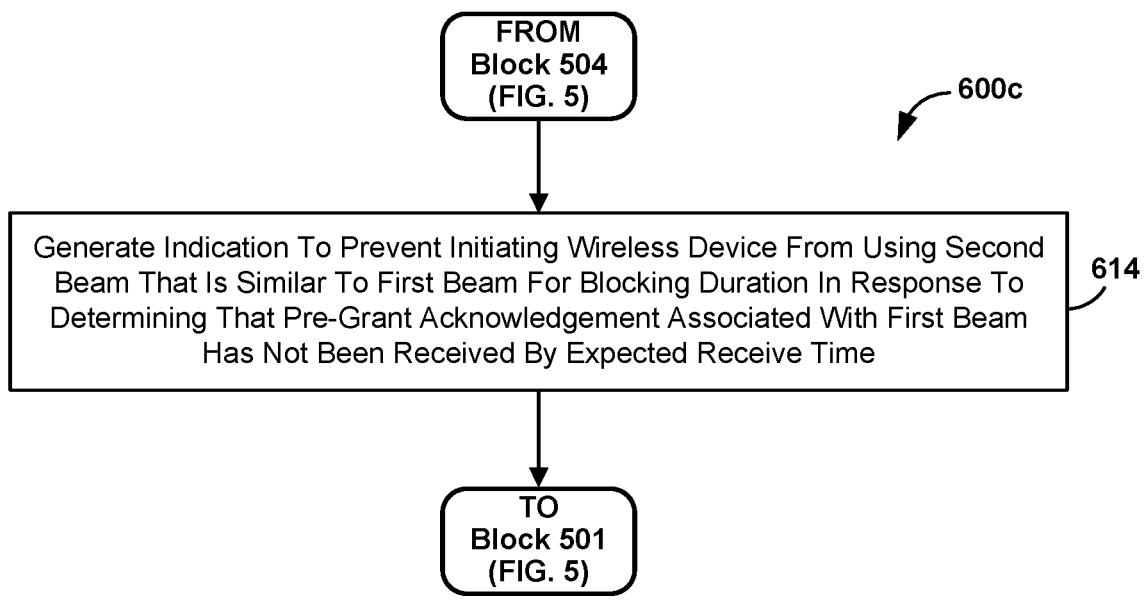

Referring to FIG. 6C, following the operations of block 504 (FIG. 5), the apparatus including a processing system may generate an indication to prevent the initiating wireless device from using a second beam that is similar to the first beam for the blocking duration in response to determining that the pre-grant acknowledgement associated with the first beam has not been received by the expected receive time, in block 614. In some implementations, the apparatus including a processing system may determine whether a second beam is similar to the first beam based on a quasi-co-location (QCL) characteristic of each beam. For example, the apparatus may determine one or more other beams that derive a QCL relationship from the same parent beam as the first beam. The apparatus may determine that the one or more other beams are similar to the first beam in response to determining that the one or more other beams derive their QCL relationship from the same parent beam as the first beam. In some implementations, the apparatus may generate an indication to prevent the initiating wireless device from using the one or more other beams that derive the QCL relationship from the same parent beam as the first beam. Means for performing functions of the operations in block 602 may include an apparatus including the processing system (such as 210, 212, 214, 216, 218, 252, 260, 424).

Following the operations of block 614, the apparatus including a processing system may perform the operations of block 602 (FIG. 6) as described.

Figure 6D:
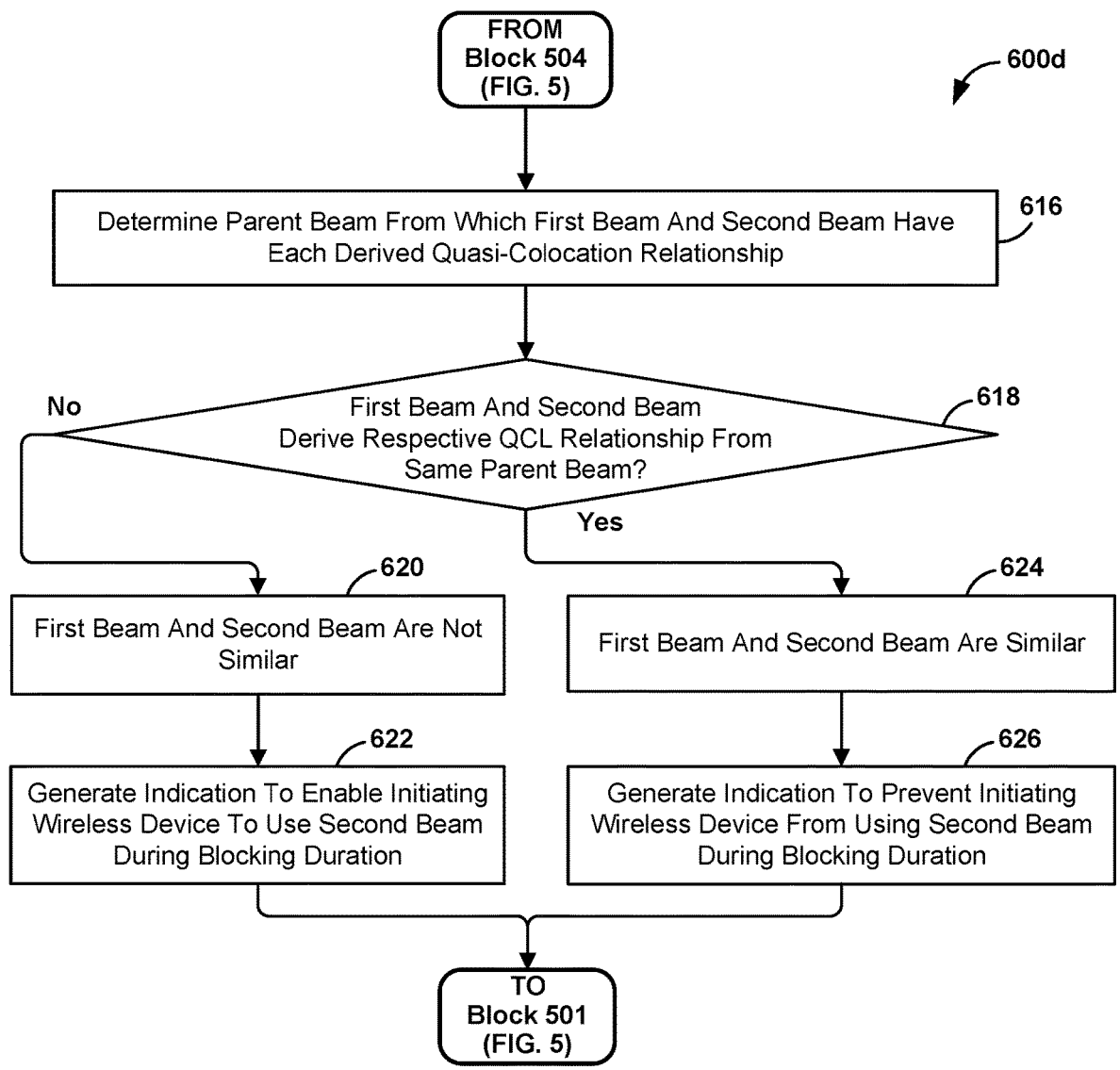

The operations 600*d* provide some additional detail regarding the operations 600*c*. Referring to FIG. 6D, following the operations of block 504 (FIG. 5), the apparatus including a processing system may determine a parent beam from which the first beam and the second beam have each derived a QCL relationship, in block 616. For example, the first beam and the second beam may each derive their respective QCL relationship from the same synchronization signal block (SSB) or another suitable parent beam. Means for performing functions of the operations in block 602 may include an apparatus including the processing system (such as 210, 212, 214, 216, 218, 252, 260, 424).

In determination block 618, the apparatus including a processing system may determine whether the first beam and the second beam derive their respective QCL relationship from the same parent beam. Means for performing functions of the operations in block 602 may include an apparatus including the processing system (such as 210, 212, 214, 216, 218, 252, 260, 424).

In response to determining that the first beam and the second beam do not derive their respective QCL relationship from the same parent beam (i.e., determination block 618="No"), the apparatus including a processing system may determine that the first beam and the second beam are not similar in block 620. Means for performing functions of the operations in block 602 may include an apparatus including the processing system (such as 210, 212, 214, 216, 218, 252, 260, 424).

In block 622, the apparatus including a processing system may generate an indication to enable the initiating wireless device to use the second beam that is not similar to the first beam. In some implementations, the apparatus may generate the indication to enable the initiating wireless device to use the second beam during the blocking duration. Means for performing functions of the operations in block 602 may include an apparatus including the processing system (such as 210, 212, 214, 216, 218, 252, 260, 424).

In response to determining that the first beam and the second beam derive their respective QCL relationship from the same parent beam (i.e., determination block 618="Yes"), the apparatus including a processing system may determine that the first beam and the second beam are similar in block 624. Means for performing functions of the operations in block 602 may include an apparatus including the processing system (such as 210, 212, 214, 216, 218, 252, 260, 424).

In block 626, the apparatus including a processing system may generate an indication to prevent the initiating wireless device from using the second beam that is similar to the first beam. In some implementations, the apparatus may generate the indication to prevent the initiating wireless device from using the second beam during the blocking duration. Means for performing functions of the operations in block 602 may include an apparatus including the processing system (such as 210, 212, 214, 216, 218, 252, 260, 424).

Following the operations of block 622 or block 626, the apparatus including a processing system may proceed to perform the operations of block 502 (FIG. 5) as described.

Figure 7:
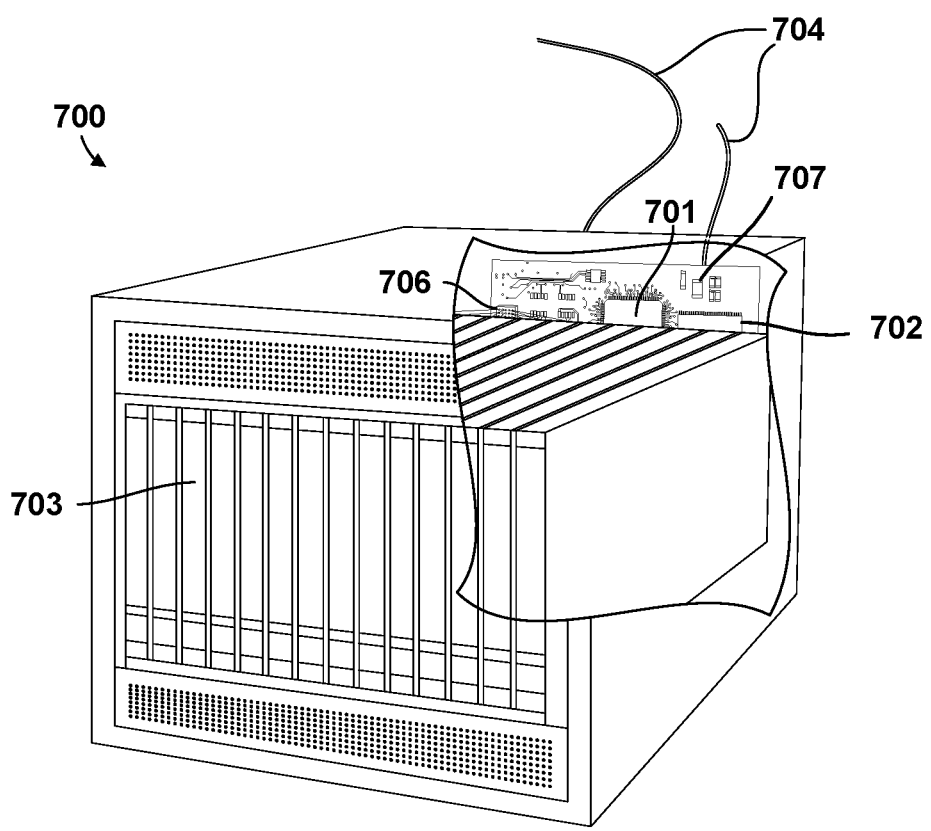
FIG. 7 shows a component block diagram of an example network computing device.

FIG. 7 shows a component block diagram of an example of a network computing device 700. With reference to FIGS. 1-7, the network computing device 700 may function as a network element of a communication network, such as a base station (for example, the base station 110, 350). The network computing device 700 may include a apparatus including a processing system 701 coupled to volatile memory 702 and a large capacity nonvolatile memory, such as a disk drive 703. The network computing device 700 also may include a peripheral memory access device such as a floppy disc drive, compact disc (CD) or digital video disc (DVD) drive 706 coupled to the processing system 701. The network computing device 700 also may include network access ports 704 (or interfaces) coupled to the processing system 701 for establishing data connections with a network, such as the Internet or a local area network coupled to other system computers and servers. The network computing device 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

Figure 8:
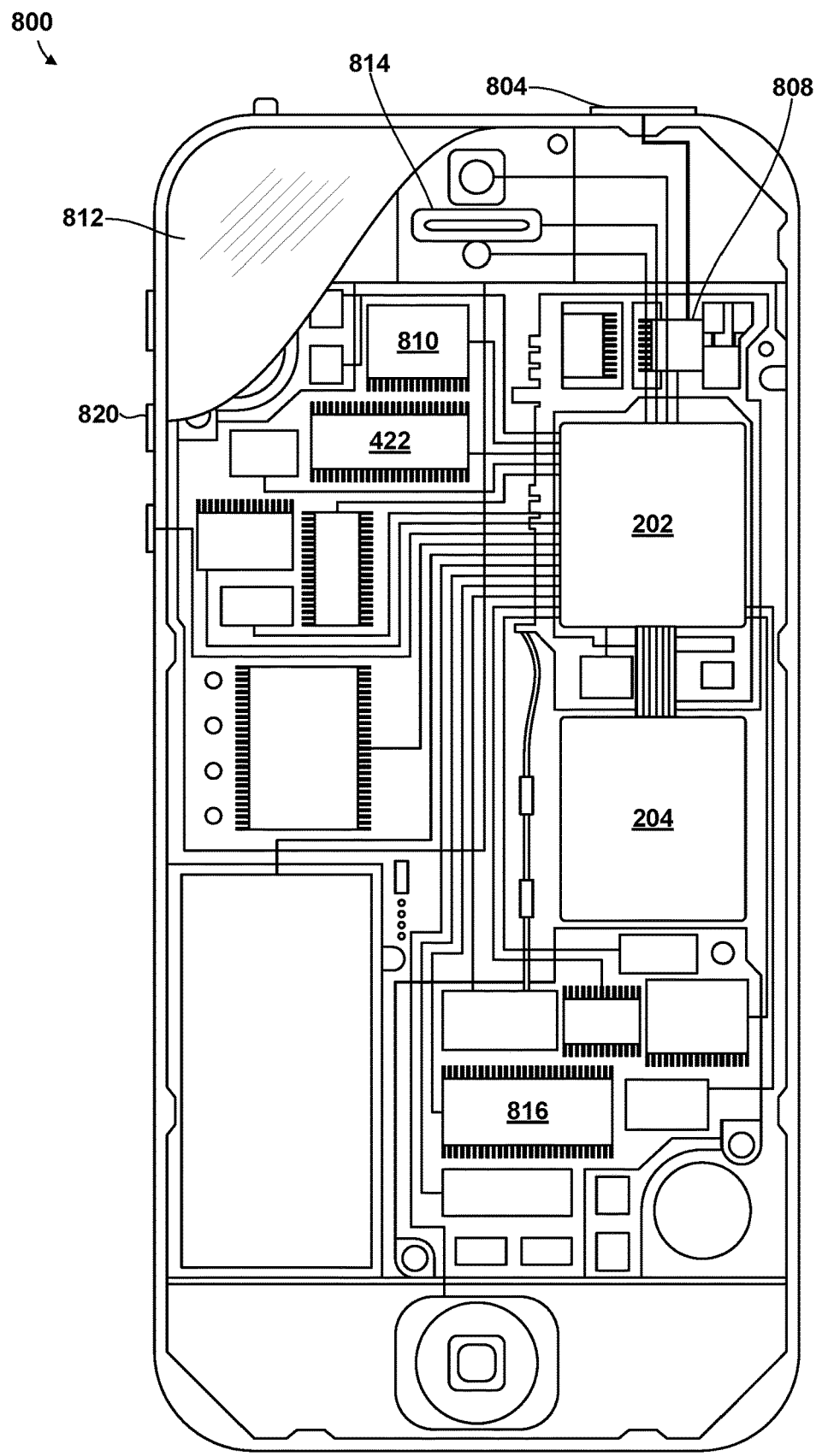
FIG. 8 shows a component block diagram of an example wireless device.

FIG. 8 shows a component block diagram of an example wireless device 800. With reference to FIGS. 1-8, the wireless device 800 (such as the wireless device 120*a*-120*e*, 200, 320, 404) may be a device suitable for implementing various implementations, such as a mobile device. The wireless device 800 may include a first SOC 202 (such as a SOC-CPU) coupled to a second SOC 204 (such as a 5G capable SOC). The first and second SOCs 202, 204 may be coupled to internal memory 422, 816, a display 812, and to a speaker 814. Additionally, the wireless device 800 may include an antenna 804 for sending and receiving electromagnetic radiation that may be connected to a wireless data link or cellular telephone transceiver 808 coupled to one or more processors in the first or second SOCs 202, 204. The wireless device 800 may include menu selection buttons or rocker switches 820 for receiving user inputs.

The wireless device 800 also may include a sound encoding/decoding (CODEC) circuit 810, which digitizes sound received from a microphone into data packets suitable for wireless transmission and decodes received sound data packets to generate analog signals that are provided to the speaker 814 to generate sound. One or more of the processors in the first and second SOCs 202, 204, wireless transceiver 808 and CODEC 810 may include a digital signal processor (DSP) circuit (not shown separately).

The apparatus including a processing system of the wireless network computing device 700 and the smart phone 800 may be any programmable microprocessor, microcomputer or multiple processor chip or chips that can be configured by processor-executable instructions to perform a variety of functions, including the functions of the various implementations described herein. In some mobile devices, multiple processors may be provided, such as one processor within an SOC 204 dedicated to wireless communication functions and one processor within an SOC 202 dedicated to running other applications. Software applications may be stored in the memory 422, 816 before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by an apparatus of a wireless device including a processing system configured with processor-executable instructions to perform operations of the methods of the following implementation examples; the example methods discussed in the following paragraphs implemented by a wireless device including means for performing functions of the methods of the following implementation examples; and the example methods discussed in the following paragraphs may be implemented as a non-transitory processor-readable storage medium having stored thereon processor-executable instructions configured to cause a processor or processing system of a wireless device to perform the operations of the methods of the following implementation examples.

Example 1. A method of managing beam selection performed by an initiating wireless device, including: determining whether a pre-grant acknowledgement associated with a first beam has been received from a responding wireless device within an expected receive time, where the pre-grant acknowledgement is responsive to a pre-grant associated with the first beam; and generating an indication to prevent the initiating wireless device from using the first beam for a blocking duration in response to determining that the pre-grant acknowledgement associated with the first beam has not been received within the expected receive time.

Example 2. The method of example 1, further including: transmitting to the responding wireless device a second pre-grant associated with the first beam after the blocking duration; determining whether a second pre-grant acknowledgement responsive to the second pre-grant has been received from the responding wireless device within an expected receive time; increasing the blocking duration in response to determining that the second pre-grant acknowledgement has not been received; and maintaining the indication to prevent the initiating wireless device from using the first beam for the increased blocking duration.

Example 3. The method of example 2, further including: generating an indication to enable the initiating wireless device to use the first beam in response to determining that the second pre-grant has been received from the responding wireless device within the expected receive time.

Example 4. The method of any of examples 1-3, where generating the indication to prevent the initiating wireless device from using the first beam for the blocking duration includes generating the indication to prevent the initiating wireless device from using the first beam for a blocking duration for each channel access priority class (CAPC).

Example 5. The method of example 4, where the blocking duration for one CAPC differs from the blocking duration of at least one other CAPC.

Example 6. The method of any of examples 1-5, further including: generating an indication to prevent the initiating wireless device from using a second beam that is similar to the first beam for the blocking duration in response to determining that the pre-grant acknowledgement associated with the first beam has not been received within the expected receive time.

Example 7. The method of example 6, where generating the indication to prevent the initiating wireless device from using the second beam that is similar to the first beam for the blocking duration includes: determining a parent beam from which the first beam and the second beam have each derived a quasi-colocation relationship; and generating the indication to prevent the initiating wireless device from using the second beam in response to determining that the first beam and the second beam have derived a respective quasi-colocation relationship from a same parent beam.

Example 8. The method of example 6, further including: generating an indication to enable the initiating wireless device to use a second beam that is not similar to the first beam during the blocking duration.

As used in this application, the terms "component," "module," "system," and the like are intended to include a processing system-related entity, such as, but not limited to, hardware, firmware, a combination of hardware and software, software, or software in execution, which are configured to perform particular operations or functions. For example, a component may be, but is not limited to, a process running on an apparatus including a processing system, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative logics, logical blocks, modules, components, circuits, and algorithm operations described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented as hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of managing beam selection performed by an initiating wireless device, comprising: generating an indication that prevents an initiating wireless device from using a first beam for a blocking duration in response to a determination that a pre-grant acknowledgement associated with the first beam has not been received within an expected receive time; transmitting to the responding wireless device a second pre-grant associated with the first beam after the blocking duration; and generating an indication that prevents the initiating wireless device from using a second beam for the blocking duration in response to a determination that the first beam and the second beam have derived a respective quasi-colocation relationship from a parent beam.

2. The method of claim 1, further comprising: increasing the blocking duration in response to a determination that a second pre-grant acknowledgement responsive to the second pre-grant has not been received from the responding wireless device within a respective expected received time; and maintaining the indication to prevent the initiating wireless device from using the first beam for the increased blocking duration.

3. The method of claim 2, further comprising: generating an indication to enable the initiating wireless device to use the first beam in response to a determination that the second pre-grant has been received from the responding wireless device within the respective expected receive time.

4. The method of claim 1, wherein generating the indication to prevent the initiating wireless device from using the first beam for the blocking duration includes generating the indication to prevent the initiating wireless device from using the first beam for a blocking duration for each channel access priority class (CAPC).

5. The method of claim 4, wherein the blocking duration for one CAPC differs from the blocking duration of at least one other CAPC.

6. The method of claim 1, further comprising: generating an indication to enable the initiating wireless device to use a second beam that is not similar to the first beam during the blocking duration.

7. An apparatus of a wireless device, comprising: a wireless transceiver; and a processing system coupled to the wireless transceiver and configured to: generate an indication that prevents an initiating wireless device from using a first beam for a blocking duration in response to a determination that a pre-grant acknowledgement associated with the first beam has not been received within an expected receive time; transmit to the responding wireless device a second pre-grant associated with the first beam after the blocking duration; and generate an indication that prevents the initiating wireless device from using the second beam for the blocking duration in response to a determination that the first beam and the second beam have derived a respective quasi-colocation relationship from a parent beam.

8. The apparatus of claim 7, wherein the processing system is further configured to: increase the blocking duration in response to a determination that a second pre-grant acknowledgement responsive to the second pre-grant has not been received from the responding wireless device within a respective expected received time; and maintain the indication to prevent the initiating wireless device from using the first beam for the increased blocking duration.

9. The apparatus of claim 8, wherein the processing system is further configured to: generate an indication to enable the initiating wireless device to use the first beam in response to a determination that the second pre-grant has been received from the responding wireless device within the respective expected receive time.

10. The apparatus of claim 7, wherein the processing system is further configured to generate the indication to prevent the initiating wireless device from using the first beam for the blocking duration comprises generating the indication to prevent the initiating wireless device from using the first beam for a blocking duration for each channel access priority class (CAPC).

11. The apparatus of claim 10, wherein the blocking duration for one CAPC differs from the blocking duration of at least one other CAPC.

12. The apparatus of claim 7, wherein the processing system is further configured to: generate an indication to enable the initiating wireless device to use a second beam that is not similar to the first beam during the blocking duration.

13. A non-transitory processor-readable medium having stored thereon processor-executable instructions configured to cause a processing system of a wireless device to perform operations comprising: generating an indication that prevents an initiating wireless device from using a first beam for a blocking duration in response to a determination that a pre-grant acknowledgement associated with the first beam has not been received within an expected receive time; transmitting to the responding wireless device a second pre-grant associated with the first beam after the blocking duration; and generating an indication that prevents the initiating wireless device from using a second beam for the blocking duration in response to a determination that the first beam and the second beam have derived a respective quasi-colocation relationship from a parent beam.

14. The non-transitory processor-readable medium of claim 13, wherein the stored processor-executable instructions are configured to cause a processing system of a wireless device to perform operations further comprising: increasing the blocking duration in response to a determination that a second pre-grant acknowledgement responsive to the second pre-grant has not been received from the responding wireless device within a respective expected received time; and maintaining the indication to prevent the initiating wireless device from using the first beam for the increased blocking duration.

15. The non-transitory processor-readable medium of claim 14, further comprising: generating an indication to enable the initiating wireless device to use the first beam in response to a determination that the second pre-grant has been received from the responding wireless device within the respective expected receive time.

16. The non-transitory processor-readable medium of claim 13, wherein the stored processor-executable instructions are configured to cause a processing system of a wireless device to perform operations such that generating the indication to prevent the initiating wireless device from using the first beam for the blocking duration includes generating the indication to prevent the initiating wireless device from using the first beam for a blocking duration for each channel access priority class (CAPC).

17. The non-transitory processor-readable medium of claim 16, wherein the stored processor-executable instructions are configured to cause a processing system of a wireless device to perform operations such that the blocking duration for one CAPC differs from the blocking duration of at least one other CAPC.

18. The non-transitory processor-readable medium of claim 13, wherein the stored processor-executable instructions are configured to cause a processing system of a wireless device to perform operations further comprising: generating an indication to enable the initiating wireless device to use a second beam that is not similar to the first beam during the blocking duration.

19. A wireless device, comprising: means for generating an indication that prevents an initiating wireless device from using a first beam for a blocking duration in response to a determination that a pre-grant acknowledgement associated with the first beam has not been received within an expected receive time; means for transmitting to the responding wireless device a second pre-grant associated with the first beam after the blocking duration; and means for generating an indication that prevents the initiating wireless device from using a second beam for the blocking duration in response to a determination that the first beam and the second beam have derived a respective quasi-colocation relationship from a parent beam.

20. The wireless device of claim 19, further comprising: means for increasing the blocking duration in response to a determination that a second pre-grant acknowledgement responsive to the second pre-grant has not been received from the responding wireless device within a respective expected received time; and means for maintaining the indication to prevent the initiating wireless device from using the first beam for the increased blocking duration.

21. The wireless device of claim 20, further comprising: means for generating an indication to enable the initiating wireless device to use the first beam in response to a determination that the second pre-grant has been received from the responding wireless device within the respective expected receive time.

22. The wireless device of claim 19, wherein means for generating the indication to prevent the initiating wireless device from using the first beam for the blocking duration comprises means for generating the indication to prevent the initiating wireless device from using the first beam for a blocking duration for each channel access priority class (CAPC), wherein the blocking duration for one CAPC differs from the blocking duration of at least one other CAPC.

* * * * *